(12) United States Patent (10) Patent No.: US 7,788,726 B2
Teixeira (45) Date of Patent: Aug. 31, 2010

(54) SYSTEM AND METHODOLOGY PROVIDING INFORMATION LOCKBOX

(75) Inventor: Steven L. Teixeira, Palo Alto, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 2009 days.

(21) Appl. No.: 10/605,644

(22) Filed: Oct. 15, 2003

(65) Prior Publication Data

US 2005/0005145 A1 Jan. 6, 2005

Related U.S. Application Data

(60) Provisional application No. 60/481,054, filed on Jul. 2, 2003.

(51) Int. Cl.
*H04L 29/06* (2006.01)
*G06F 21/00* (2006.01)

(52) U.S. Cl. .......................................... 726/26; 707/781
(58) Field of Classification Search ........................ None
See application file for complete search history.

(56) References Cited

U.S. PATENT DOCUMENTS

| 4,914,586 A | 4/1990 | Swinehart et al. ............ 707/101 |
| 5,172,227 A | 12/1992 | Tsai et al. ..................... 358/133 |
| 5,412,427 A | 5/1995 | Rabbani et al. ............... 348/394 |
| 5,475,817 A | 12/1995 | Waldo et al. ................. 709/316 |
| 5,586,260 A | 12/1996 | Hu ............................... 713/201 |
| 5,623,601 A | 4/1997 | Vu ............................... 713/201 |
| 5,652,621 A | 7/1997 | Adams, Jr. et al. ........... 348/272 |
| 5,682,152 A | 10/1997 | Wang et al. ..................... 341/50 |
| 5,745,701 A | 4/1998 | Nguyen-Thai et al. ....... 709/249 |
| 5,754,227 A | 5/1998 | Fukuoka ...................... 348/232 |
| 5,764,887 A | 6/1998 | Kells et al. ................... 713/200 |
| 5,798,794 A | 8/1998 | Takahashi .................... 348/398 |
| 5,815,574 A | 9/1998 | Fortinsky ..................... 713/153 |
| 5,818,525 A | 10/1998 | Elabd ........................... 348/268 |
| 5,828,833 A | 10/1998 | Belville et al. ............... 713/201 |
| 5,832,211 A | 11/1998 | Blakley et al. ............... 713/202 |
| 5,838,903 A | 11/1998 | Blakely et al. ............... 713/202 |
| 5,848,193 A | 12/1998 | Garcia .......................... 382/232 |
| 5,857,191 A | 1/1999 | Blackwell et al. ............. 707/10 |
| 5,864,665 A | 1/1999 | Tran ............................. 713/201 |
| 5,875,296 A | 2/1999 | Shi et al. ...................... 713/202 |
| 5,881,230 A | 3/1999 | Christensen et al. ......... 709/203 |
| 5,907,610 A | 5/1999 | Onweller ..................... 379/242 |
| 5,913,088 A | 6/1999 | Moghadam et al. .......... 396/311 |
| 5,917,542 A | 6/1999 | Moghadam et al. .......... 348/207 |
| 5,926,105 A | 7/1999 | Wakamatsu .................. 370/401 |
| 5,968,176 A | 10/1999 | Nessett et al. ................ 713/201 |
| 5,983,350 A | 11/1999 | Minear et al. ................ 713/201 |
| 5,987,611 A | 11/1999 | Freund ........................ 713/201 |
| 5,996,077 A | 11/1999 | Williams ..................... 713/201 |
| 6,008,847 A | 12/1999 | Bauchspies .................. 348/391 |
| 6,028,807 A | 2/2000 | Awsienko ................. 365/230.02 |

(Continued)

*Primary Examiner*—Gilberto Barron, Jr.
(74) *Attorney, Agent, or Firm*—John A. Smart

(57) ABSTRACT

A system providing a secure lockbox methodology for protecting sensitive information is described. In one embodiment, the methodology includes steps of receiving input of sensitive information from a user; computing a data shadow of the sensitive information for storage in a repository; based on the data shadow stored in the repository, detecting any attempt to transmit the sensitive information; and blocking any detected attempt to transmit the sensitive information that is not authorized by the user.

53 Claims, 5 Drawing Sheets

U.S. PATENT DOCUMENTS

| | | | |
|---|---|---|---|
| 6,064,437 A | 5/2000 | Phan et al. | 348/446 |
| 6,091,777 A | 7/2000 | Guetz et al. | 375/240 |
| 6,098,173 A | 8/2000 | Elgressy et al. | 713/201 |
| 6,125,201 A | 9/2000 | Zador | 382/166 |
| 6,134,327 A | 10/2000 | Van Oorschot | 380/30 |
| 6,154,493 A | 11/2000 | Acharya et al. | 375/240.19 |
| 6,158,010 A | 12/2000 | Moriconi et al. | 713/201 |
| 6,167,438 A | 12/2000 | Yates et al. | 709/216 |
| 6,212,558 B1 | 4/2001 | Antur et al. | 709/221 |
| 6,243,420 B1 | 6/2001 | Mitchell et al. | 375/240.18 |
| 6,247,062 B1 | 6/2001 | Sarkar | 709/245 |
| 6,249,820 B1 | 6/2001 | Dobbins et al. | 709/238 |
| 6,269,099 B1 | 7/2001 | Borella et al. | 370/389 |
| 6,304,973 B1 | 10/2001 | Williams | 713/201 |
| 6,321,334 B1 | 11/2001 | Jerger et al. | 713/200 |
| 6,330,562 B1 | 12/2001 | Boden et al. | 707/10 |
| 6,345,361 B1 | 2/2002 | Jerger et al. | 713/200 |
| 6,351,816 B1 | 2/2002 | Mueller et al. | 713/201 |
| 6,356,929 B1 | 3/2002 | Gall et al. | 709/201 |
| 6,393,474 B1 | 5/2002 | Eichert et al. | 709/223 |
| 6,393,484 B1 | 5/2002 | Massarani | 709/227 |
| 6,438,612 B1 | 8/2002 | Ylonen et al. | 709/249 |
| 6,449,723 B1 | 9/2002 | Elgressy et al. | 713/201 |
| 6,453,419 B1 | 9/2002 | Flint et al. | 713/201 |
| 6,466,932 B1 | 10/2002 | Dennis et al. | 707/3 |
| 6,473,800 B1 | 10/2002 | Jerger et al. | 709/226 |
| 6,480,962 B1 | 11/2002 | Touboul | 713/200 |
| 6,484,261 B1 | 11/2002 | Wiegel | 713/201 |
| 6,490,679 B1 | 12/2002 | Tumblin et al. | 713/155 |
| 6,499,110 B1 | 12/2002 | Moses et al. | 713/201 |
| 6,510,513 B1 | 1/2003 | Danieli | 713/156 |
| 6,526,513 B1 | 2/2003 | Shrader et al. | 713/200 |
| 6,539,483 B1 | 3/2003 | Harrison et al. | 713/201 |
| 6,553,498 B1 | 4/2003 | Elgressy et al. | 713/201 |
| 6,598,057 B1 | 7/2003 | Synnestvedt et al. | 370/352 |
| 6,643,776 B1 | 11/2003 | Boden et al. | 709/224 |
| 6,606,708 B1 | 12/2003 | Devine et al. | 713/201 |
| 2002/0174355 A1* | 11/2002 | Rajasekaran et al. | 713/193 |
| 2003/0055962 A1 | 3/2003 | Freund et al. | 709/225 |
| 2003/0084339 A1* | 5/2003 | Roginsky et al. | 713/201 |
| 2003/0177389 A1 | 9/2003 | Albert et al. | 713/201 |
| 2004/0162808 A1* | 8/2004 | Margolus et al. | 707/1 |

* cited by examiner

SYSTEM AND METHODOLOGY PROVIDING INFORMATION LOCKBOX

CROSS REFERENCE TO RELATED APPLICATIONS

The present application is related to and claims the benefit of priority of the following commonly-owned, presently-pending provisional application(s): application Ser. No. 60/481,054, filed Jul. 2, 2003, entitled "System and Methodology Providing Information Lockbox", of which the present application is a non-provisional application thereof. The present application is related to the following commonly-owned, presently-pending application(s): application Ser. No. 09/944,057, filed Aug. 30, 2001, entitled "System Providing Internet Access Management with Router-based Policy Enforcement"; application Ser. No. 10/159,820, filed May 31, 2002, entitled "System and Methodology for Security Policy Arbitration". The disclosures of each of the foregoing applications are hereby incorporated by reference in their entirety, including any appendices or attachments thereof, for all purposes.

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

APPENDIX DATA

Computer Program Listing Appendix under Sec. 1.52(e): This application includes a transmittal under 37 C.F.R. Sec. 1.52(e) of a Computer Program Listing Appendix. The Appendix, which comprises text file(s) that are IBM-PC machine and Microsoft Windows Operating System compatible, includes the below-listed file(s). All of the material disclosed in the Computer Program Listing Appendix can be found at the U.S. Patent and Trademark Office archives and is hereby incorporated by reference into the present application.

Object Description: SourceCode1.txt, created Jul. 2, 2003 2:12 PM, size 31 KB; Object ID: File 1; Object Contents: Source Code.

Object Description: SourceCode2.txt, created Aug. 12, 2003 3:39 PM, size 74 KB; Object ID: File 2; Object Contents: Source Code.

BACKGROUND OF INVENTION

1. Field of the Invention

The present invention relates to system and methodology for securing sensitive user information, such as that commonly stored on personal computers or other data processing devices, for preventing unauthorized access to that information.

2. Description of the Background Art

Individuals and businesses are growing increasingly comfortable with conducting their affairs over the Internet. One side effect of this growing trust in technology is that the amount of personal or confidential information traveling through the Internet is increasing proportionally. This sensitive information can include personal identification numbers (PINs), user names, passwords, credit card numbers, Social Security numbers, phone numbers, and more. The consequences of this information falling into dishonest hands can include disasters such as identity theft, financial loss, and proprietary information theft, just to name a few.

A personal firewall featuring application control solves much of this problem of protecting sensitive information by disallowing network access to untrusted applications. However, firewalls alone cannot solve the problem of information leaking from legitimate, trusted applications, such as web browsers, email agents, or instant messenger applications.

Another solution that solves much of this growing problem involves running a software agent to monitor the PC's network traffic. This simplified or basic "lockbox" approach ensures that sensitive information is not transmitted outside the local host without the user's knowledge. If sensitive information is discovered during this process, the underlying security engine may give the user the ability to block or modify the outgoing request. Note that this type of protection differs from "electronic wallet" technology common today in that e-wallet technology is intended to make electronic commerce more convenient by safely optimizing the e-commerce checkout process, whereas this "lockbox" technology is intended to prevent sensitive data from leaving a PC without the user's knowledge.

The simplified lockbox approach has its problems, however. Storage of reference copies of the sensitive information in a simple lockbox creates a new point of vulnerability. The lockbox itself becomes a potential target for attack and compromise. Therefore, a better solution is sought.

What is needed is a system that includes methods for protecting sensitive information (as done with a simple lockbox), but which does not itself become a point of vulnerability. In particular, the solution itself should not provide a source of sensitive information that would be an attractive target to attack. The present invention fulfills this and other needs.

SUMMARY OF INVENTION

A system providing a secure lockbox methodology for protecting sensitive information is described. In one embodiment, the methodology includes steps of receiving input of sensitive information from a user; computing a data shadow of the sensitive information for storage in a repository; based on the data shadow stored in the repository, detecting any attempt to transmit the sensitive information; and blocking any detected attempt to transmit the sensitive information that is not authorized (e.g., by the user).

DETAILED DESCRIPTION

Glossary

Figure 1:
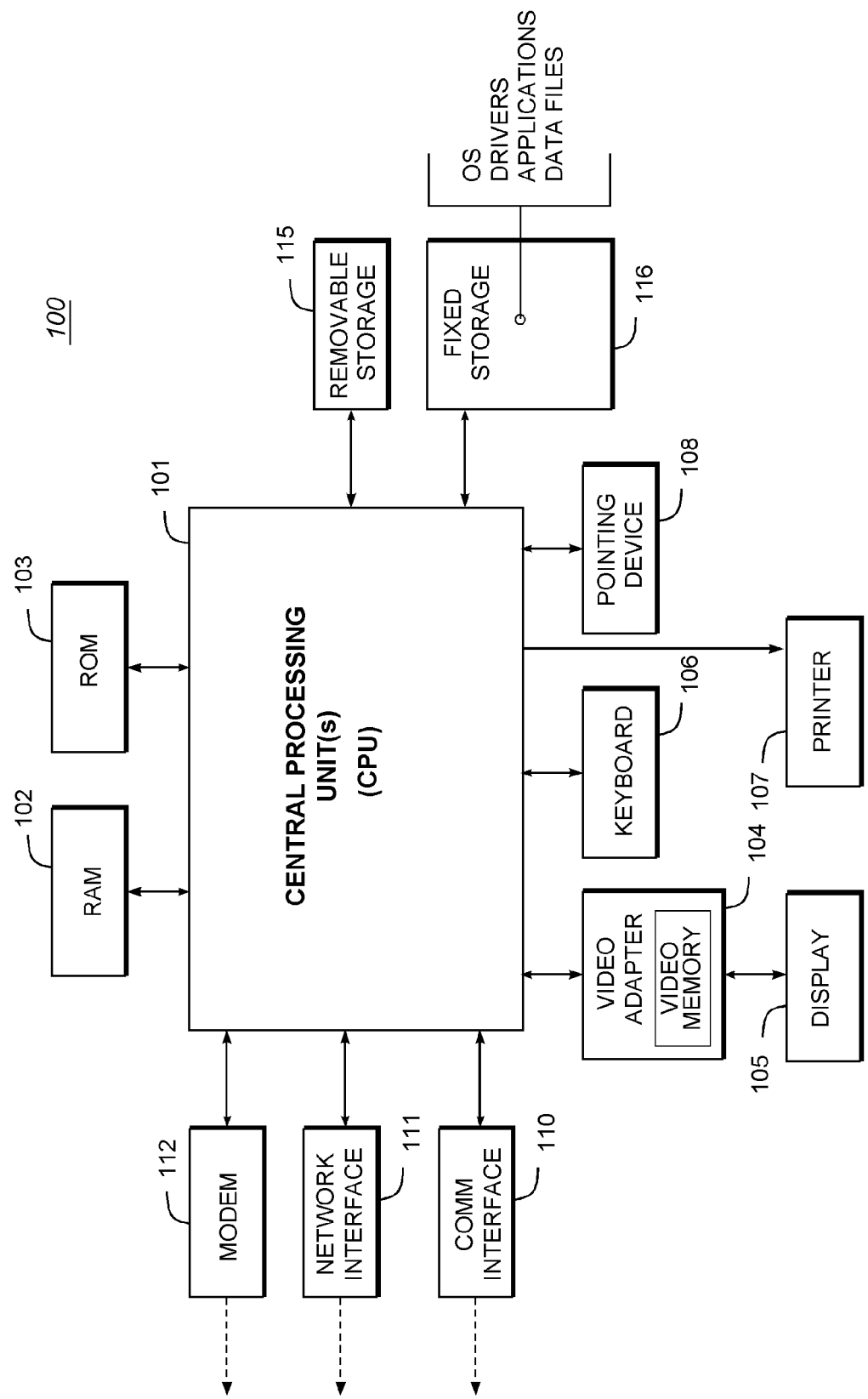
FIG. 1 is a block diagram of a computer or data processing system in which software-implemented processes of the present invention may be embodied.

CRC: Acronym for Cyclic Redundancy Check. The CRC is used to verify data block integrity or to quickly compare whether two or more data blocks are likely to be identical. In a typical scheme for identity detection, a buffer of data is passed through a CRC algorithm to generate an integral CRC value or "checksum." The mathematical model is made up of polynomials with binary coefficients. This CRC checksum can be compared against other CRC checksums that have been calculated on other data buffers using the same CRC algorithm. If the checksums match, the data buffers are likely to be identical. This application employs the CRC32 algorithm, which produces checksums that are 32 bits in size.

Hash (function): A mathematical function that maps values from a large (or very large) domain into a smaller range, and that reduces a potentially long message into a "message digest" or "hash value" or that is sufficiently compact to be input into a digital signature algorithm. A "good" hash function is one that results from applying the function to a (large) set of values that are evenly (and randomly) distributed over the range.

MD5: The MD5 (Message Digest number 5) algorithm generate a unique, 128-bit cryptographic message digest value derived from the contents of input stream. This value is considered to be a highly reliable fingerprint that can be used to verify the integrity of the stream's contents. If as little as a single bit value in the file is modified, the MD5 checksum for the file changes. Forgery of a stream in a way that causes MD5 to generate the same result as that for the original file is considered to be extremely difficult. Details for the MD5 cryptographic checksum algorithm and C source code are provided in RFC 1321.

Message Digest: A message digest is a compact digital signature for an arbitrarily long stream of binary data. An ideal message digest algorithm would never generate the same signature for two different sets of input, but achieving such theoretical perfection would require a message digest as long as the input file. Practical message digest algorithms compromise in favor of a digital signature of modest and usually fixed size created with an algorithm designed to make preparation of input text with a given signature computationally infeasible.

SHA: Secure Hash Algorithm was designed by the National Security Agency (NSA) in 1993 as the algorithm of the Secure Hash Standard (SHS, FIPS 180). It was modeled after MD4 with additional improvements. An undisclosed security problem prompted the NSA to release an improved SHA-1 in 1995. Florent Chabaud and Antoine Joux later discovered a differential collision attack against SHA in 1998. There are currently no known cryptographic attacks against SHA-1.

Introduction

Referring to the figures, exemplary embodiments of the invention will now be described. The following description will focus on the presently preferred embodiment of the present invention, which is typically implemented in software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware or combinations thereof.

Computer-Based Implementation

Basic System Hardware (e.g., for Computer/Data Processing Device)

The present invention may be implemented on a conventional or general-purpose computer or data processing system, such as an IBM-compatible personal computer (PC), a server computer (e.g., UNIX workstation, Linux workstation, or Windows server), a hand-held data processing device (e.g., Palm® device or Pocket PC device), or the like. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP Laserjet printer (available from Hewlett Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Hewlett-Packard of Palo Alto, Calif., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

Basic System Software

Figure 2:
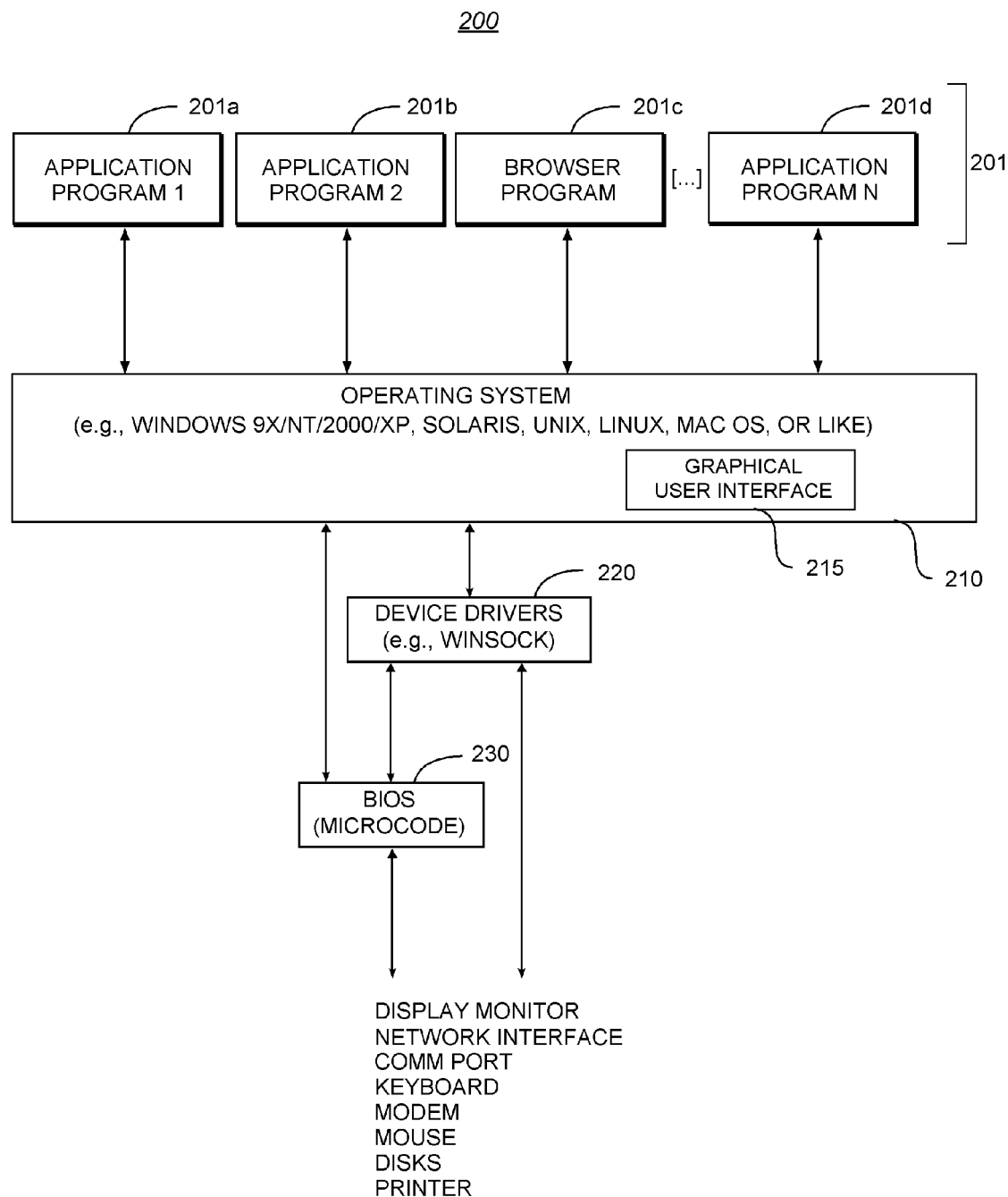
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100. The applications or other software intended for use on the computer system 100 may also be stored as a set of downloadable computer-executable instructions, for example, for downloading and installation from an Internet location (e.g., Web server).

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft Windows 9x, Microsoft Windows NT, Microsoft Windows 2000, or Microsoft Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying computer or data processing components that may be employed for implementing the present invention. For purposes of discussion, the following description will present examples in which it will be assumed that there exists a computer system or other data processing device (e.g., handheld device) that receives sensitive information that may be potentially transmitted to other devices (e.g., Web server) or otherwise removed from the system (e.g., removed as a file). The present invention, however, is not limited to any particular environment or device configuration. In particular, use of a particular computing architecture (e.g., desktop PC) is not necessary to the invention, but is used to provide a framework for discussion. Instead, the present invention may be implemented in any type of system architecture or processing environment capable of supporting the methodologies of the present invention presented in detail below.

Secure Lockbox

Introduction: Simple Lockbox

One approach to protecting sensitive user information is to provide an interface that enables the end-user to enter the information to be protected and store this information securely in a local repository. A "security engine" may then inspect network data leaving the computer, for example in an HTTP POST request, and compare that data against the contents in the local repository. If sensitive information is discovered during this process, the security engine may give the user the ability to block or modify the outgoing request.

Figure 3:
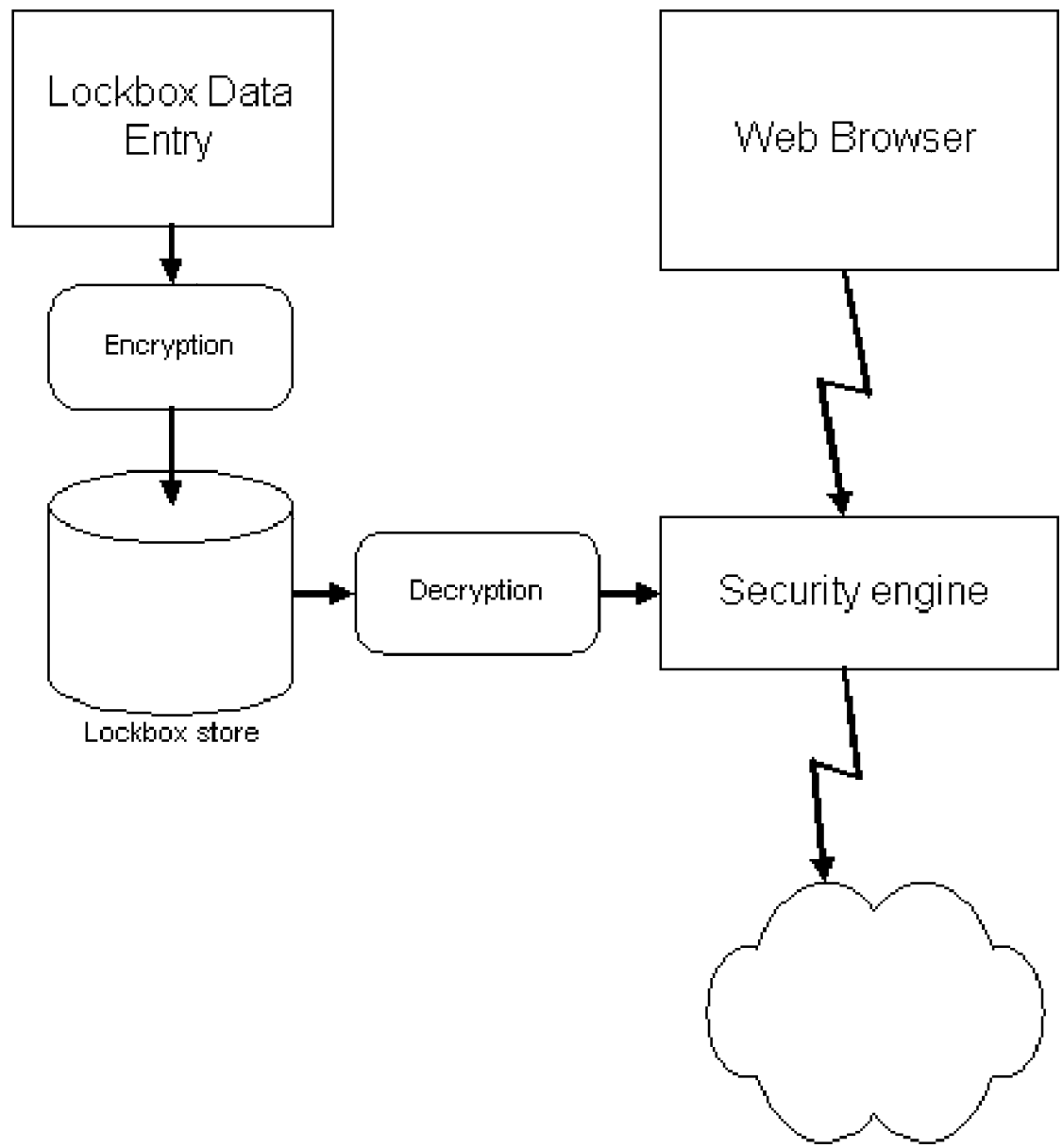
FIG. 3 is a block diagram of a simple lockbox system.

FIG. 3 illustrates one such system. Drilling down into the "security engine" portion of the diagram, the basic approach in the illustrated implementation only need be a simple substring search, taking each lockbox entry in turn and searching for that string within a buffer of outbound data. Because the encryption and decryption of the sensitive data is performed on the same machine, a symmetric key will typically be used in this technique, meaning the same cryptographic key is used for both encryption and decryption. The basic approach may be improved by obfuscating or encrypting the sensitive information stored in the local repository, making the repository more of an "information lockbox." This would make it more difficult for the information to become compromised by resident software or an individual with physical access to the PC. The present invention improves this basic architecture as will now be described in detail.

Secure Lockbox Using Data Shadows

The simple lockbox system illustrated in FIG. 3 is improved in accordance with the present invention by using "data shadows." More particularly, the present invention provides a system having a secure lockbox that has the particular advantage that it does not put sensitive data at risk for compromise (e.g., unauthorized access), because the lockbox never stores the actual data. Instead, it stores a "shadow" of the sensitive data which cannot be reverse engineered and can be used to safely detect the original sensitive data in network traffic (or other point of interest, such as in a document or file).

In the currently preferred embodiment, this shadow can take one of two forms depending on the type of data:

1. Structured data, such as a credit card number (or other structured financial information) or a Social Security number, is stored as a regular expression representing the data, and a hash (i.e., signature or fingerprint) of the data. In one embodiment, the hash is created using the Message Digest 5 (MD-5) algorithm. (Those skilled in the art will appreciate that other hashing algorithms, such as SHA-1, may be employed in accordance with the present invention.) The regular expression provides a means to detect data by matching a general format, while the MD-5 signature or hash provides a statistically unique fingerprint for an individual datum. Prior to MD-5 calculation, the structure (e.g., formatting) is stripped from the data (e.g., dashes or parenthesis between digits) so that the calculation can be performed on the normalized data. A MD-5 value is 128-bits in size and is known as a "one-way" hash because it is impossible to derive the original data from the MD5 message digest or hash value.

2. Literal data, such as a password, is stored as an integer (length) plus the MD5 hash of the data. The integer specifies the size or length of the literal data. (Again, those skilled in the art will appreciate that other hashing algorithms may be employed in accordance with the present invention.)

In accordance with the present invention, the user enters information to be protected. The manner in which that information is actually entered by the user determines how it is processed by the system of the present invention. In one embodiment, upon entering an item, the user selects what type of item he or she has just entered. For example, the entered item may be a password (e.g., either case-sensitive or case-insensitive text), a telephone number, a Social Security number, or the like. Alternatively (and/or in addition to the foregoing), the system may include program logic or heuristics to assist with the identification of type; for example, matching a Social Security number based on a template of ###-##-####, or matching a phone number based on a template of (###) ###-####. As illustrated in further detail below, a variety of different types may be entered by the user. The particular type specified for an item determines how the item is parsed by the system, and ultimately what information (metadata) gets stored for the item for future comparison operations (when outbound network traffic is monitored).

Besides assisting with the detection of the item, the specification of type allows the system of the present invention to store the item in a normalized form. Storage in a normalized form allows the system to extract the underlying data of interest, irrespective of how it may be formatted at a given instant in time. For example, the user's phone number may be formatted in a variety of different ways, but the underlying data (i.e., the phone number itself) is a single item to be protected.

Additionally, this approach allows the system to store metadata information for sensitive data in a manner that gives the fewest hints possible as to the actual format of the underlying data being protected. Thus, the metadata serves as a secure descriptor for the sensitive data. In the case of a password, for example, a regular expression (e.g., indicating case treatment at different character positions) is inappropriate, since that information could possibly be misused for guessing the password. Thus, in a preferred embodiment, the only information stored for a password is its size (length) and MD-5 value. In contrast, less sensitive data may be stored as a regular expression.

For example, a phone number may be stored as a regular expression, since "cracking" the phone number with the regular-expression metadata is usually inconsequential.

Engine Support

To implement the present invention, an existing security module/engine (e.g., Zone Labs' TrueVector engine, available from Zone Labs of San Francisco, Calif.) may be modified to detect the presence of sensitive information in outbound network data. Detailed operation of the TrueVector engine itself may be found in commonly-owned, co-pending applications Ser. Nos. 09/944,057 and 10/159,820. As described below, the approach adopted is much more complex than a simple substring search (e.g., simple search using encrypted lockbox). Instead, the security engine is adapted to make one or more passes over each buffer of outgoing network data, as follows:

1. For structured data, a regular expression search is preformed on the buffer. If a regular expression match is made, the data is normalized by stripping away the structure, and an MD5 hash is calculated on the normalized data. If the resulting hash matches an entry in the lockbox, a sensitive data match is statistically guaranteed.

2. For literal data, multiple MD5 calculations are performed on the same data buffer based on sub-buffers of sizes given by the lengths of literal data items in the lockbox. If the MD5 hash matches, a sensitive data match is statistically guaranteed.

The underlying security engine further protects the PC and the information it contains. For example, Zone Labs' TrueVector security engine employs a variety of measures to guard against the potential compromise of the engine itself, making it very difficult for a hacker to exploit internal APIs or functionality for their own benefit.

Treatment of Separate Data Types

In the currently preferred embodiment, data is categorized into two types: structured data and literal data. Structured data is used to store non-password information, such as phone numbers, Social Security numbers, credit card numbers (or other structured financial information), and the like. This type of information or data is such that one would expect it to be communicated in typical expressions, such as a phone number which comprises three digits, followed by three digits, followed by four digits. Literal data is employed for passwords and other items where content, not structure, is important.

Structured data may be divided conceptually into two subtypes. In a first subtype, the data type implies the format (e.g., phone number, Social Security number, and the like). The second subtype includes case-sensitive and case-insensitive text strings, where there is no predefined data type. With the second subtype, the system builds a regular expression on-the-fly by examining the text string. An example of the second subtype would be a passphrase. For instance, given the passphrase of "My dog has fleas," the system may build a regular expression of a capital letter, a lowercase letter, a whitespace, three lowercase letters, etc., terminated by a symbol. The advantage of generating the regular expression is that the system of the present invention is able to more quickly locate matches for the item of interest, when searching a large set of data (e.g., outbound network traffic). When a match is found based on regular expression comparison, the system of the present invention may then normalize the match, compute a MD-5 message digest for the match, and then compare that to the corresponding signature maintained in the metadata stored by the system. Use of regular expression technique enables one to easily process data (e.g., digits) that is delimited by arbitrary characters (e.g., spaces, slashes, dashes, or the like) or other formatting structure. In the two kinds of structured data, the first subtype is preferably normalized. The second subtype, however, can contain simple case-sensitive or case-insensitive strings that do not need to be normalized and may be taken verbatim (in the same manner as literal data).

System Components

Basic Architecture

Figure 4:
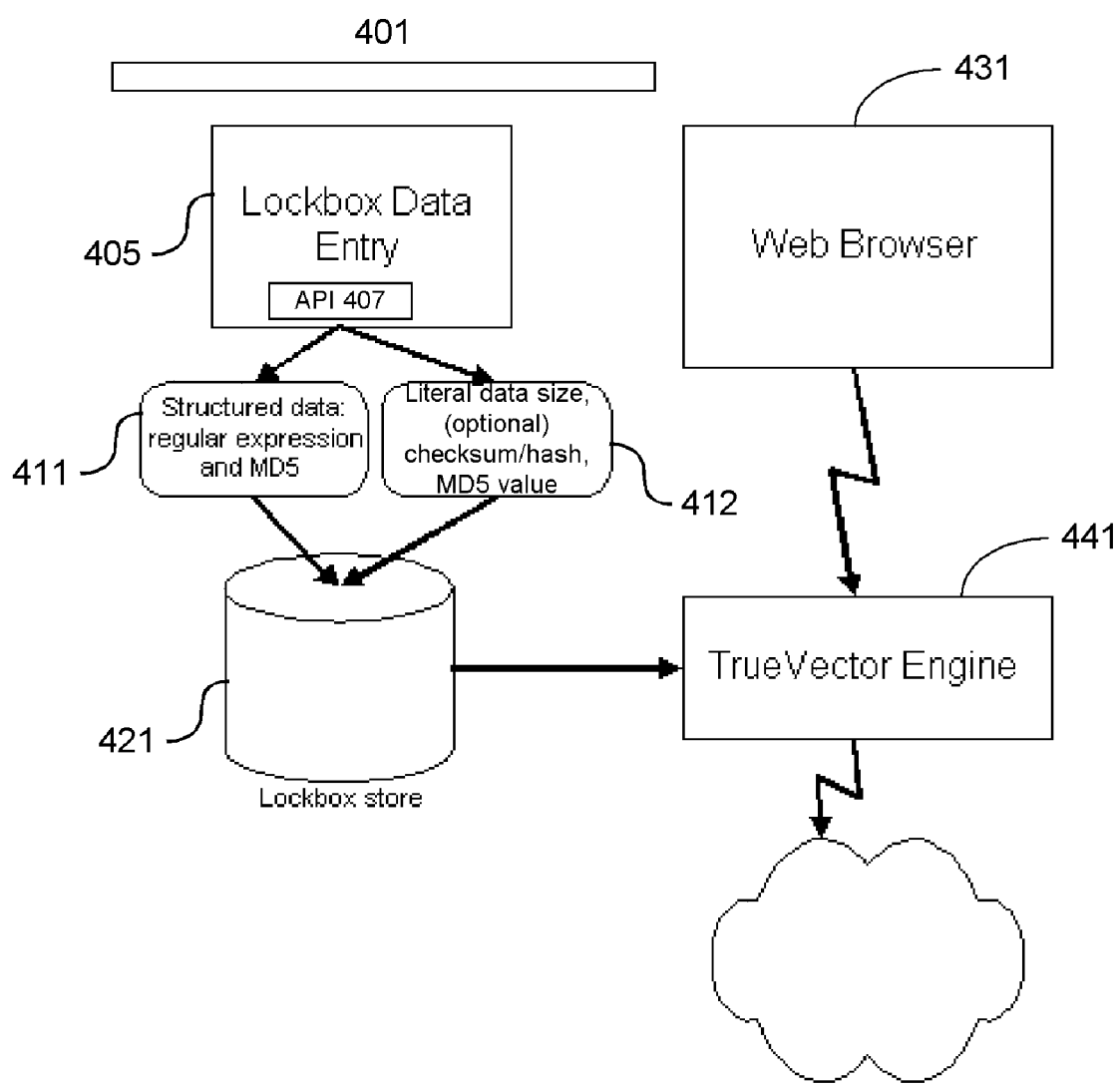
FIG. 4 is a block diagram of a secure lockbox system constructed in accordance with the present invention.

FIG. 4 is a block diagram illustrating the high-level components of a secure information lockbox system of the present invention. As shown, the system 400 includes a lockbox subsystem 401 in communication with a Web browser 431 through a security/rules (TrueVector) engine 441. The lockbox subsystem 401 includes a lockbox data entry component 405, data shadow components 411, 412, and a lockbox store 421. The lockbox data entry component 405 includes an API (application programming interface) layer 407, so that any user interface system may be employed to enter data into the system. Exemplary API functionality includes API functions for managing lockbox items, for instance, adding an item to the lockbox, removing an item from the lockbox, getting the lockbox items, and setting the lockbox items.

The lockbox data entry component 405 includes built-in intelligence. For example, it provides intelligence for indicating the type of a particular data item. That intelligence is passed through the data shadow components 411, 412 in order to store a "shadow" of the incoming data. In particular, these components distill the data into what type of information it may be stored as, such as regular expressions, MD-5 signatures, or the like. The shadow itself is a combination of several fingerprint characteristics. With this approach, the system is able to compare "shadows" of data without having to compare the actual data itself.

System Integration with Security Engine (e.g., Zone Labs' TrueVector Engine)

The currently preferred embodiment is implemented by modifying an existing security engine, such as Zone Labs' TrueVector engine. During operation, the security engine monitors network traffic at a very low level in the network stack. Although this has the advantage of security and transparency to application-level software, the approach is not well suited to the task of parsing traffic encrypted with technologies such as SSL or VPN (i.e., connection-layer encryption). Note, however, that the presence of connection-layer encryption generally means that the device, such as a PC, is communicating with a trusted host, which substantially obviates the need for lockbox protection (for that particular connection). Therefore, it is not necessary to implement the secure information lockbox with support for handling encrypted network traffic. Should support be desired, however, the embodiment may be integrated at the application layer via browser plug-ins or similar means in order to handle encrypted content, thereby providing support for use in conjunction with connection-layer encryption.

Computer-Implemented Methodology

Overview of Basic Methodology

Figure 5:
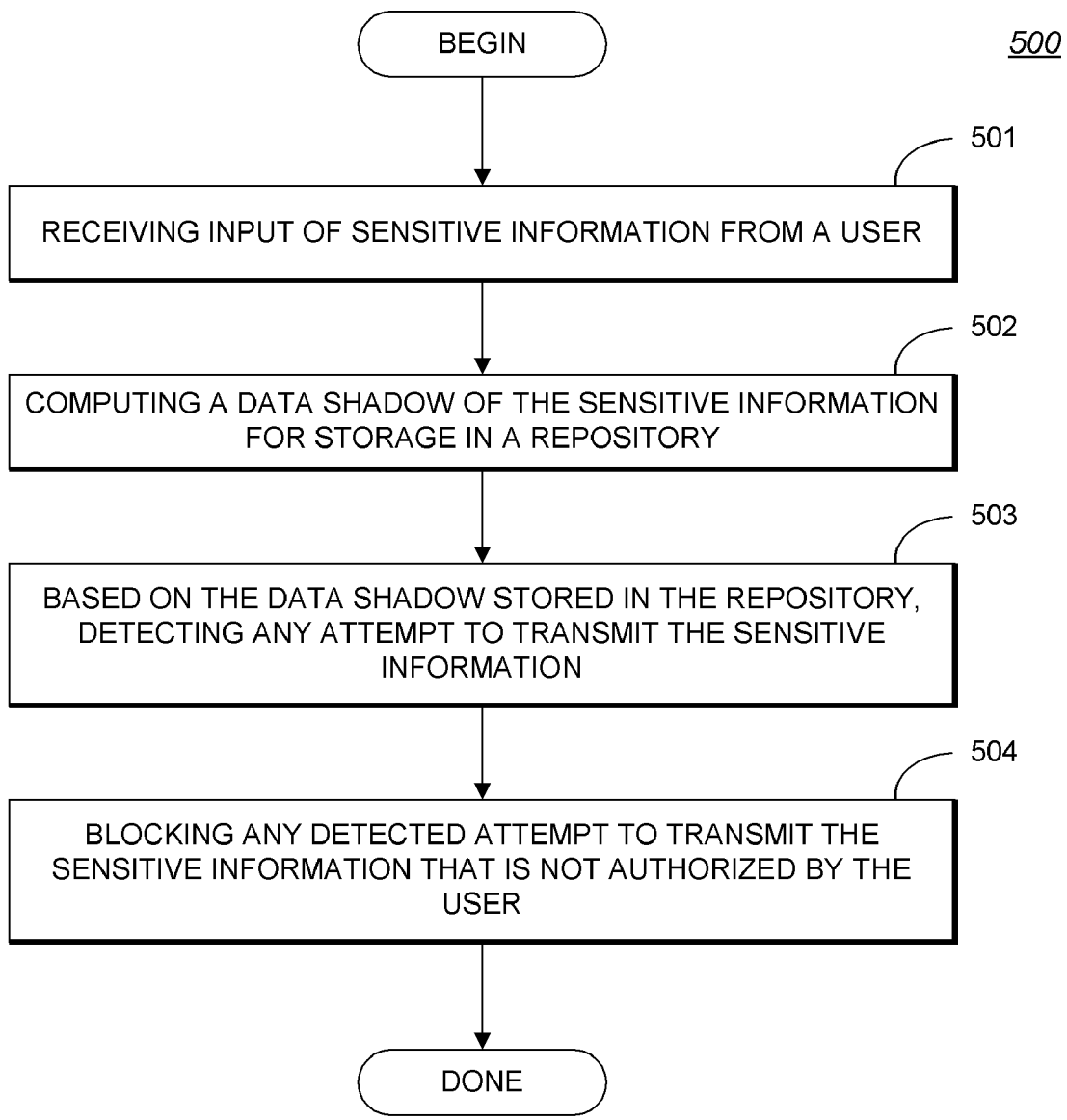
FIG. 5 is a high-level flowchart illustrating a computer-implemented method of the present invention for providing a secure lockbox for protecting sensitive information.

FIG. 5 is a high-level flowchart illustrating a computer-implemented method 500 of the present invention for providing a secure lockbox for protecting sensitive information. The steps are as follows. At step 501, input of sensitive information is received from a user. Next, at step 502, the computer-implemented method computes a data shadow of the sensitive information for storage in a repository. At step 503, the method detects, based on the data shadow stored in the repository, any attempt to transmit the sensitive information. Finally, as illustrated by step 504, the method blocks any detected attempt to transmit the sensitive information that is not authorized by the user.

Lockbox API and Basic Data Structure

In the present embodiment, a lockbox API (application programming interface) is implemented in LockPub.h (header file) and LockPub.cpp (source code module file), and includes the following API calls:

tvAddItemToLockbox
tvRemoveItem From Lockbox
tvGetLockboxItems
tvSetLockboxItems Additionally, the module defines an enumerated type, TLockboxDataType, as follows:

enum TLockboxDataType {LBDT_STRING, LBDT_
    STRING_CI, LBDT_USPHONE, LBDT_SSN,
    LBDT_VISAMC, LBDT_AMEX};

The module also defines a lockbox item data structure, TLockboxItem, as follows:

struct TLockboxItem

```
{
DWORD dwItemID;
TLockboxDataType lbdt;
char szDescription[128];
char szHash[32];
char szRegEx[256];      // used for LBDT_STRING & LBDT_
STRING_CI
};
```

The LockPub code module invokes the internal functions that reside in the LockPriv module, which will be described next.

Building Regular Expressions for the Lockbox

The LockPriv module contains core routines/methods that operate as follows. "BuildRegExString" is invoked with a string and in response attempts to build a regular expression. This method is invoked in the instance that the system does not know the form of the expression upfront (e.g., it is not a well formed expression, such as a phone number). Thus, in the instance of case-sensitive or case-insensitive text, the method is called to build a regular expression from that input text string. The character array "RegExShortcuts" indicates the possible types:

const char* RegExShortcuts[ ]={NULL, "[[:alpha:]]",
    "\\u", "\\l", "\\d", "\\s", "[^[:alpha:]\\d\\s]"};

Here, the types include empty (NULL), alphanumeric ([[:alpha:]]), uppercase (\\u), lowercase (\\l), digit (\\d), space (\\s), and non-alphanumeric ([^[:alpha:]\\d\\s]). Consider the example of case-sensitive text: "Hello World!" Given that text as the input string, "BuildRegExString" generates a regular expression of:

\\u \\l{3} \\s \\u \\l{4} [^[:alpha:]\\d\\s]

This indicates: uppercase character, followed by three lowercase characters, followed by space character, followed by uppercase character, followed by four lowercase characters, followed by a non-alphanumeric character. In this manner, the method identifies each character as one of the regular expression types, and thus may parse a given input string for building a regular expression.

Given a regular expression, the system may now proceed to hash it. Recall that there are two cases: plain (unstructured) text and well-formed text. In the case of plain text, the system may simply apply a MD-5 hash to the text for generating a message digest (i.e., signature); both are stored in the currently preferred embodiment (by the LBStore module). This is stored as one data structure element that contains a regular expression (i.e., the format information) and a corresponding MD-5 hash, but note that the underlying input data itself is not stored.

Finding Items in the Lockbox

The system invokes a "FindIt" method for any data that is indicated to be well-formed data. The "FindIt" method provides pattern-matching/searching capability for well-formed data, where the system has a preconceived notion of the regular expression (format) of the data, based on the data type that is indicated to the system (e.g., phone number, Social Security number, and the like). As previously described, the well-formed data is enumerated to be one of a "TLockboxDataType", including string (LBDT_STRING), case-insensitive string (LBDT_STRING_CI), U.S. phone number (LBDT_USPHONE), Social Security number (LBDT_SSN), Visa/MasterCard number (LBDT_VISAMC), and American Express number (LBDT_AMEX). It will be appreciated that any number of other regular expressions may be added for handling (e.g., street addresses, postal codes, and the like), as desired, for a given embodiment. The "FindIt" method first performs a regular expression match to confirm the input data. Next, the method uses the regular expression as a means for formatting the input data, which is then returned by the method. For example, the phone number "(408) 321-9624" (i.e., formatted string) is returned as "4083219624" (i.e., just the data, without the formatting). Thus, "FindIt" will perform pattern matching against templates (prebuilt regular expressions) of well-formed types to confirm that the data in fact is well formed (thus alleviating the need to build a de novo regular expression for the data). The result of "FindIt" may then be passed to a helper function, MD5Hash, for generating a MD-5 hash on the data itself (i.e., without regard to formatting). Only the hash and type need be stored (by LBStore) in this case, as the regular expression here is a predefined type (already represented within the system by a template). Note that the original data is not stored. Instead, the system stores a template descriptor and a fingerprint or hash of the original data. In the currently preferred embodiment, the hash information is stored using base 64 storage which facilitates storage as base-64 text (e.g., for an .ini file). However, if desired, the information may be left in binary format and stored using binary storage technique. If the "FindIt" method is invoked with data that does not match the specified lockbox data type, the system will detect the mismatch and will not add the particular data item to the lockbox with an incorrect data type.

Literal or unstructured data, such as a password, is handled differently. The system performs a MD-5 calculation on the data, and then stores the MD-5 message digest and the length of the data. A faster algorithm (such as checksum (e.g., CRC32), hash, or the like) could optionally be included as a first pass optimization. In that instance, the system would also store the value (e.g., CRC32 value) calculated for the first pass optimization. However, such an approach may compromise security and therefore is not included in the currently preferred embodiment (but may be appropriate for creating less secure embodiments, if desired).

Given the lockbox data store (stored by LBStore) and given an outgoing buffer of data, the system proceeds as follows to determine whether an instance of the lockbox data (i.e., lockbox item) is contained within the outgoing data. Consider, for instance, a Web session were the user is submitting information via a Web-based form. The TrueVector engine will trap the outgoing information (outbound buffer) and pass it to the lockbox system for processing. For efficiency purposes in the currently preferred embodiment, the TrueVector engine only passes data for inspection that may contain user information, such as an outgoing HTTP POST request. This may be broken down further, for example, limiting the inspected data to HTML fields within the HTML document (that is the subject of the HTTP POST). Similarly, for SMTP (e-mail) protocol, the system may limit examination to outgoing data that comprises the e-mail message body. Thus, by virtue of the well-defined protocols for transferring information over the Internet, the system may be configured for purposes of efficiency to focus on outgoing data that is likely to contain lockbox items. (However, if desired, one could deploy a system that examines all outgoing data, with the understanding that such a deployment would likely run slower.)

For a given buffer of outgoing data or text, the actual task of examining the outgoing data for lockbox items falls on an "IsTextInLockbox" method. The method may be implemented as follows:

```
 1: bool IsTextInLockbox(char* szStr)
 2: {
 3:     PLockboxItem pli;
 4:     PLockboxItem plitemp;
 5:     int i;
 6:     std::string strexp, strfound, strhash;
 7:     DWORD dwItemCnt = 0;
 8:     bool bRet = false;
 9:     if (InternalGetLockboxItems(NULL, &dwItemCnt) && (dwItemCnt > 0))
10:     {
11:         pli = (PLockboxItem)(malloc(dwItemCnt * sizeof(TLockboxItem)));
12:         if (pli)
13:         {
14:             __try
15:             {
16:                 InternalGetLockboxItems(pli, &dwItemCnt);
17:                 plitemp = pli;
18:                 for (i = 0; i < (int)dwItemCnt; i++)
19:                 {
20:                     if ((plitemp->lbdt == LBDT_STRING) || (plitemp->lbdt == LBDT_STRING_CI))
21:                         strexp = plitemp->szRegEx;
22:                     else
23:                         strexp = g_StandardExpressions[plitemp->lbdt];
24:                     bRet = FindAll(szStr, strexp.c_str( ), g_StandardFormats[plitemp->lbdt],
25:                         plitemp->szHash, plitemp->lbdt != LBDT_STRING_CI);
26:                     if (bRet)
27:                         break;
28:                     plitemp++;
29:
30:                     strfound = FindIt(szStr, strexp.c_str( ), g_StandardFormats[plitemp->lbdt]);
31:                     if (!strfound.empty( ))
32:                     {
33:                         // convert case insensitive data to upper case before
```

-continued

```
hashing
34:              if (plitemp->lbdt == LBDT_STRING_CI)
35:                  strupr(const_cast<char*>(strfound.c_str( )));
36:              strhash = MD5Hash((unsigned char*)(strfound.
    c_str( )),
strfound.length( ));
37:              bRet = strcmp(strhash.c_str( ), plitemp->szHas
h) == 0;
38:              if (bRet)
39:                  break;
40:          }
41:          plitemp++;
42:
43:      }
44:  }
45:  __finally
46:  {
47:      free(pli);
48:  }
49:  }
50:  }
51:  return bRet;
52: }
```

Typically, the passed-in buffer (i.e., the "szStr" buffer) will not be large but, instead, will be on the order of a few kilobytes. As shown by the embodiment above, the method makes multiple passes through the data looking for the different lockbox items. As shown at line 20, the method looks at the item type (for the lockbox item being sought) to determine whether it is an expression of type "LBDT_STRING" or "LBDT_STRING_CI" (i.e., regular expression comprising string or case-insensitive string). If such a type is found, then the method will perform a regular expression search throughout the buffer looking for that expression. In the currently preferred embodiment, an existing regular expression engine is employed at this point, such as the public domain Boost C++ library (available from boost.org) or the PCRE (Perl Compatible Regular Expressions) library (available from PCRE.org). A regular expression engine, like a GREP tool, will return a character position for a given match, when found (if any). When a match is found, the method computes a MD-5 hash on the matched portion (i.e., substring in the buffer), as shown at line 36. Now, this computed MD-5 hash may be compared to the corresponding hash in the lockbox entry, as illustrated by line 37. The method returns the Boolean (True/False) result. If a match is found (i.e., True), the system has identified the data as a lockbox item and may take appropriate action, such as blocking the transmission of the data or prompting the user for permission to transmit the data. In the currently preferred embodiment, the exact action taken depends on what corresponding policy has been configured to apply. If the MD-5 hash does not match, then the system knows that the data has the exact same format but is in fact different (from any lockbox item of the user) and therefore may be passed through for transmission.

Items that have well-defined formats (e.g., phone numbers, Social Security numbers, and the like) are searched first using the regular expression format (to find a candidate match having the same type of format). When an expression is found that is a possible match (based on format), the underlying data itself must be normalized. The normalization of data is a feature of regular expression processing. Within a regular expression, one may define subexpressions. Using that feature, the characters or digits which comprise the data may be defined to be subexpressions. Therefore, the data may be normalized by taking all of the subexpressions together as representative of the underlying data. The collection of subexpressions, which effectively strips out all formatting, is then used for purposes of MD-5 computation and comparison. If a MD-5 match of a lockbox entry with a normalized set of some expressions is found, then the system has identified the data as a lockbox item and may proceed accordingly (as discussed above). If the MD-5 hash does not match, then the system knows that the data has the exact same format but is in fact different (from any lockbox item of the user) and therefore may be passed through for transmission.

For literal data, processing proceeds as follows. Recall that for literal data, the system stores length. Using this information, the system may create a sliding window (equal in size to the length) and pass that window over the data buffer. As the window is slid over the data, the system will calculate a MD-5 value for the then-current window and then compare the calculated value to corresponding MD-5 values stored in the lockbox. Once a match is found, the system they take appropriate action (as previously described).

Source Code Implementation

Appended herewith is a source code appendix illustrating embodiment of the secure information lockbox, in accordance with the present invention. The source code may be compiled/linked using Borland C++ Builder, available from Borland Software Corporation of Scotts Valley, Calif. Other C++ compilers/linkers are available from a variety of vendors, including Microsoft Corporation of Redmond, Wash. and Sun Microsystems of Mountain View, Calif.

While the invention is described in some detail with specific reference to a single-preferred embodiment and certain alternatives, there is no intent to limit the invention to that particular embodiment or those specific alternatives. For instance, those skilled in the art will appreciate that modifications may be made to the preferred embodiment without departing from the teachings of the present invention.

What is claimed is:

1. In a computer system, a method for protecting sensitive information, the method comprising:
   receiving input of sensitive information from a user;
   computing a data shadow of the sensitive information for storage in a repository, and thereafter discarding the input so that the sensitive information itself is not stored;
   based on the data shadow stored in the repository, detecting any attempt to transmit the sensitive information; and
   blocking any detected attempt to transmit the sensitive information that is not authorized by the user.

2. The method of claim 1, wherein said sensitive information comprises structured data.

3. The method of claim 2, wherein said data shadow is computed for the structured data as a regular expression and a hash.

4. The method of claim 3, wherein said hash comprises a MD-5 hash.

5. The method of claim 2, wherein said structured data includes credit card number information.

6. The method of claim 2, wherein said structured data includes Social Security number information.

7. The method of claim 3, wherein said regular expression represents formatting information for said structured data.

8. The method of claim 3, wherein said hash is computed after normalization of the structured data.

9. The method of claim 8, wherein said normalization includes removing any formatting information before computing the hash.

10. The method of claim 1, wherein said sensitive information comprises structured data and said detecting step includes:

initially detecting said structured data by matching a format for that structured data.

11. The method of claim 1, wherein said sensitive information comprises literal data.

12. The method of claim 11, wherein said data shadow is computed for the literal data as a length value plus at least one hash of the literal data.

13. The method of claim 12, wherein said at least one hash includes an additional first pass hash or checksum value computed for the literal data.

14. The method of claim 12, wherein said at least one hash includes a MD-5 hash computed for the literal data.

15. The method of claim 1, wherein said at least one hash includes an optional checksum value computed for the literal data that allows relatively quick detection of the sensitive information and a MD-5 hash that allows subsequent verification.

16. The method of claim 1, wherein said receiving input step includes:
receiving input indicating a type for the sensitive information.

17. The method of claim 16, wherein said receiving input indicating a type includes:
receiving input indicating that the sensitive information is a password.

18. The method of claim 16, wherein said receiving input indicating a type includes:
receiving input indicating that the sensitive information is a Social Security number.

19. The method of claim 16, wherein said receiving input indicating a type includes:
receiving input indicating that the sensitive information is a credit card number.

20. The method of claim 16, wherein said receiving input indicating a type includes:
receiving input indicating that the sensitive information is a personal identification number (PIN).

21. The method of claim 1, further comprising:
automatically determining a type for the sensitive information that indicates formatting.

22. The method of claim 21, wherein said step of automatically determining a type includes:
matching the input against a template for identifying a type.

23. The method of claim 1, wherein said detecting step includes:
trapping an outbound buffer of data that may contain the sensitive information; and
in instances where the sensitive information comprises structured data, performing a regular expression search on the outbound buffer.

24. The method of claim 23, further comprising:
if a regular expression match is found, normalizing data from the match so as to remove formatting and thereafter computing a hash on it, for comparison with corresponding hash values stored in the repository.

25. The method of claim 24, wherein said hash is a MD-5 hash.

26. The method of claim 1, wherein said detecting step includes:
trapping an outbound buffer of data that may contain the sensitive information; and
in instances where the sensitive information comprises literal data, performing a sliding window search on the outbound buffer.

27. The method of claim 26, wherein said sliding window search includes performing an optional checksum calculation on successive blocks of bytes within the outbound buffer, for comparison with corresponding checksum values stored in the repository.

28. The method of claim 27, further comprising:
if a match is found based on the checksum comparison, verifying the match with a MD-5 hash performed on data from the match.

29. The method of claim 28, wherein said MD-5 hash performed on data from the match is compared against a corresponding MD-5 hash value stored in the repository.

30. The method of claim 1, wherein said step of blocking includes:
referencing a stored policy indicating whether the sensitive information should be blocked from transmission.

31. A non-transitory computer-readable medium having processor-executable instructions for performing the method of claim 1.

32. In a computer system, a method for securing sensitive items from inappropriate access, the method comprising:
receiving input from a user indicating that a particular sensitive item is to be protected from inappropriate access;
storing metadata characterizing the particular sensitive item, and thereafter discarding the input so that the particular sensitive item itself is not stored;
based on the stored metadata, detecting whether the particular sensitive item is present in any transmission of outgoing data; and
trapping any transmission of outgoing data that is detected to contain the particular sensitive item.

33. The method of claim 32, further comprising:
a policy indicating what action the system should be taken upon trapping transmission of outgoing data that contains the particular sensitive item.

34. The method of claim 33, wherein said action includes blocking any trapped transmission.

35. The method of claim 33, wherein said action includes querying the user about whether the particular sensitive item may be transmitted.

36. The method of claim 33, wherein said metadata includes a one-way hash of the particular sensitive item.

37. The method of claim 36, wherein said one-way hash comprises a MD-5 hash.

38. The method of claim 32, wherein said particular sensitive item comprises structured data, and wherein said metadata includes regular expression information characterizing a particular format for the structured data and includes a hash computed on unformatted data extracted from said structured data.

39. The method of claim 38, wherein said trapping step includes:
locating the particular sensitive item by first performing a regular expression search on the outgoing data for finding a match based on formatting; and
for any match found based on formatting, performing a hash on the match to determine whether it matches a corresponding hash stored as part of the metadata.

40. The method of claim 32, wherein said particular sensitive item comprises literal data and wherein said metadata comprises as a length value plus at least one hash of the literal data.

41. The method of claim 40, wherein said trapping step includes:
locating the particular sensitive item by first performing a sliding window search through the outgoing data for a block of bytes having a size equal to said length value and having a hash value equal to one of said at least one hash of the literal data.

42. The method of claim 41, wherein said at least one hash includes a MD-5 message digest computation.

43. The method of claim 42, wherein said at least one hash further includes an optional first pass hash or checksum as an optimization.

44. A non-transitory computer-readable medium having processor-executable instructions for performing the method of claim 32.

45. A system providing security for sensitive information, the system comprising:
   a data processing system receiving input of sensitive information;
   a secure lockbox module for storing a secure descriptor characterizing the sensitive information, so that the system can detect transmission of the sensitive information without a copy of the sensitive information itself being stored; and
   a security module for detecting, based on said secure descriptor, any attempted transmission of outgoing data that contains the sensitive information.

46. The system of claim 45, wherein said input includes an indication of a type for the sensitive information.

47. The system of claim 46, wherein said indication of a type includes a selected one of structured data and literal data.

48. The system of claim 47, wherein said structured data includes a credit card number.

49. The system of claim 45, further comprising:
   a security policy specifying what action is to be undertaken when the security module detects an attempt to transmit the sensitive information.

50. The system of claim 49, wherein said security policy specifies an action of blocking any attempted transmission of the sensitive information.

51. The system of claim 49, wherein said security policy specifies an action of prompting a user to allow or deny any attempted transmission of the sensitive information.

52. The system of claim 45, wherein said sensitive information includes structured data, and wherein said secure descriptor includes regular expression information characterizing a particular format for the structured data and includes a hash computed on unformatted data extracted from said structured data.

53. The system of claim 45, wherein said sensitive information includes literal data and wherein said secure descriptor includes a length value plus at least one hash of the literal data.

* * * * *